UNITED STATES PATENT OFFICE.

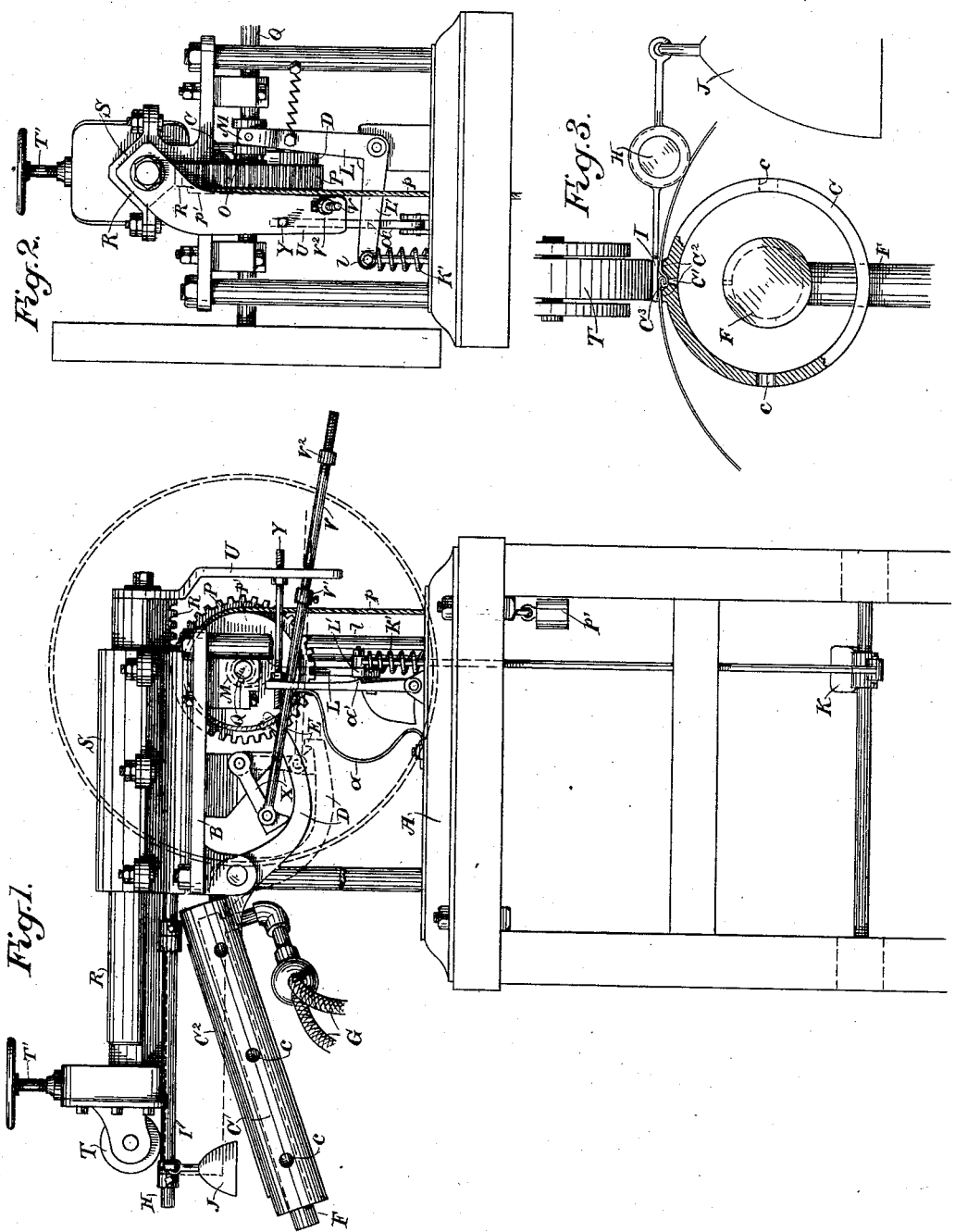

JULES GERSANT, OF DEAL, AND ARCHIBALD GEORGE BUTTIFANT, OF LONDON, ENGLAND.

CAN-SIDE-SEAM-FUSING MACHINE.

SPECIFICATION forming part of Letters Patent No. 605,605, dated June 14, 1898.

Application filed December 27, 1897. Serial No. 663,573. (No model.)

*To all whom it may concern:*

Be it known that we, JULES GERSANT, residing at Deal, and ARCHIBALD GEORGE BUTTIFANT, residing at London, England, citizens of England, have invented an Improvement in Can-Side-Seam-Fusing Machines; and we hereby declare the following to be a full, clear, and exact description of the same.

Our invention relates to that class of machines known as "can-making" machines; and it consists of novel devices and novel combinations of parts and mechanism herein shown and described, and more particularly pointed out in the claims.

Heretofore the meeting edges of can-bodies have been seamed or united by the application of solder or soldering composition in one or other of various different ways. Our invention provides means for dispensing with the use of solder or any soldering composition in the operation of can-side seaming and substituting therefor a method by which the original coating of tin or other fusible metal or material in the can is used to fuse together the overlapped edges of the can-body and produce a perfectly air-tight joint.

The object of our invention is to provide a cheap, speedy, and effective means for side-seaming the bodies of metal cans, boxes, and other vessels and articles of like nature having seams which it may be desired to hermetically seal.

In the accompanying drawings, Figure 1 is a side elevation of our machine. Fig. 2 is an end view of the same. Fig. 3 is a front edge view of the horn and its connections.

A is the base-plate of the machine and is cast hollow.

B is a suitable frame fastened to the base-plate and having the cylindrical horn C, pivoted between the two front posts of the frame and provided with the curved tailpiece D, terminating in the catch E. The rear end of the horn C is closed. The front end is open, and it is provided with lateral openings $c$ for the admission of air to intensify the combustion, hereinafter mentioned.

On the upper surface of the horn C is the longitudinal slot C', having the guides $C^2$, forming a groove $C^3$, adapted to receive the seam of a can.

Through the center of the horn C runs the pipe F, projecting at right angles through the under surface of the horn C near its rear end and connected with the flexible tubes G, through which air and gas are supplied to the pipe F, which has perforations along the upper part of its surface coincident with and directly beneath the slot C'. The forward end of this pipe projects somewhat beyond the horn C and is closed with a suitable cap.

Extending from the front of the frame and parallel with the horn C is the rod H, upon which the plate I is hinged and adjusted so as to rest on the guides $C^2$ and provided with the counterweight J, affixed to its forward end.

In forming the seams to be operated upon by our machine one edge of the can-body is bent inwardly, so as to form a hook, and the other edge is bent outwardly and downwardly, also in hook form, and the edges thus formed are brought together so that they interlock, as shown in Fig. 3, and the resilient quality of the metal retains them in place. This method of forming the seam furnishes four thicknesses of the metal to be operated upon by an invention, thereby giving great additional strength and solidity to the seam. The can-body is then slipped over the horn C in such a way that the seam fits into the groove $C^3$, which manifestly must be of not greater depth than the thickness of the seam. When a can-body has been placed on the cylindrical horn C, the operator presses down the treadle K, provided with the spiral spring K' and connected with the lever L at $l$, thereby causing the vertical arm of the lever L to slide the clutch M into one of the circle of holes in the hub O of the toothed wheel P, which fits loosely on the shaft Q, which is journaled between the rear posts of the frame B and connected with suitable driving power which rotates the wheel P. The action of the treadle K also depresses the horizontal arm L' of the lever L, thereby permitting the catch $a'$, pressed by the spring $a$, to engage the arm L' and hold it down when the treadle is released, the spring K' at the same time forcing the arm L' up against the catch a', thus keeping them firmly together. The teeth of the wheel P mesh with the rack-bar R, causing it to slide forward in the sleeve S and so force the roller T, which is fixed to the forward end of the rack-bar R, along the seam of the can, the roller T thus pressing together the hooked edges of the can while they are being subjected to the heat generated in the pipe F, whereby the several thicknesses of metal of which the seam is composed are fused together and formed into a solid airtight joint, the pressure of the roller T being regulated by the screw-press T''. When the roller has traveled to the end of the seam, the bar U, which extends downwardly from the rear of the rack-bar R, strikes the collar V' on the rod V, which is fastened to the dog X, which on being driven backward releases the catch E, thereby causing the horn C to swing downward and let the can slide off. The rack-bar R continues to travel forward until the rod Y, which is fastened to the bar U, strikes the catch a', pushing it backward and releasing the lever L, which, being actuated by the spring K', releases the clutch M from the wheel P, which is thereby freed from the shaft Q. The action of the spring or weight p', fixed beneath the base-plate A and attached to the cord p, which has been wound on the drum p' by the forward motion of the wheel P, then produces a reverse motion of the wheel P, which causes the rack-bar R and the other parts to resume their original positions, and the machine is ready to repeat the operation. By this latter movement the bar U is forced against another collar V² on the rod V, and thereby forces the rod V back and with it the dog X. The dog X in being pulled back forces the tail D of the horn down, and consequently the latter up until the dog strikes the catch E, as shown in dotted lines, Fig. 1, when the horn will then have reached its operating position.

Having thus described our invention, what we claim as new, and desire to secure by Letters Patent, is—

1. In a can-side-seaming machine, a slotted perforated tiltable cylindrical horn, guides along the slot, a hinged counterweighted plate covering the guides, a roller passing over said plate, and means for tilting and heating the horn and operating the roller.

2. The combination in a can-side-seaming machine of a tiltable horn having a longitudinal slot on its upper surface, perforations on each side, guides on the horn parallel with the slot and at a short distance from its edges so as to form a channel adapted to receive the seam of a can, and a perforated burner-pipe in the horn with one or more tubes attached to the burner-pipe and connected with a suitable supply of inflammable vapor.

3. The combination in a can-side-seaming machine of a tiltable horn having a longitudinal slot on its upper surface, perforations on each side, guides on the horn parallel with the slot and at a short distance from its edges and a perforated burner-pipe in the horn with tubes attached to the burner-pipe and connected with a suitable supply of inflammable vapor and means for tilting the horn.

4. In the can-side-seaming machine, the combination of a tiltable cylindrical horn having a longitudinal slot on its upper surface, and perforations on each side, guides on the horn parallel with the slot and at a short distance from its edges, and a perforated burner-pipe inside the horn, with tubes attached to the burner-pipe and connected with a suitable supply of inflammable vapor, means for tilting the horn, and a horizontal rack-bar having a roller attached to its forward end and adapted to pass over said seam of the can.

5. In a can-side-seaming machine the combination of a tiltable cylindrical horn having a longitudinal slot on its upper surface, perforations on each side, guides on the horn parallel with the slot and a perforated burner-pipe inside the horn, with tubes attached to the burner-pipe and connected with a supply of inflammable vapor, means for tilting the horn, a horizontal rack-bar having a roller attached to its forward end and adapted to pass over said seam of the can and a presser connected with said roller so as to regulate its action on the seam of the can.

6. The combination in a can-side-seaming machine of a tiltable cylindrical horn having a longitudinal slot on its upper surface, perforations on each side, guides on the horn parallel with the slot and a perforated burner-pipe inside the horn with tubes attached to the burner-pipe and connected with a supply of inflammable vapor, means for tilting the horn, a horizontal rack-bar having a roller attached to its forward end and adapted to press over said seam of the can, a presser connected with said roller so as to regulate its action on the seam of the can, a toothed wheel meshing with said rack-bar and loosely mounted to a shaft connected with driving power and mechanism for reversing the motion of said wheel.

In witness whereof we have hereunto set our hands.

JULES GERSANT.
ARCHIBALD GEORGE BUTTIFANT.

Witnesses:
HENRY ALFRED WOODBRIDGE,
HERBERT J. CROSS.